(12) United States Patent
Slaton (10) Patent No.: US 10,575,078 B2
(45) Date of Patent: Feb. 25, 2020

(54) SHOCK MOUNT

(71) Applicant: Guitar Center, Inc., Westlake Village, CA (US)

(72) Inventor: Robin Richard Slaton, Fort Collins, CO (US)

(73) Assignee: Guitar Center, Inc., Westlake Village, CA (US)

( * ) Notice: Subject to any disclaimer, the term of this patent is extended or adjusted under 35 U.S.C. 154(b) by 158 days.

(21) Appl. No.: 15/895,865

(22) Filed: Feb. 13, 2018

(65) Prior Publication Data

US 2018/0234752 A1  Aug. 16, 2018

Related U.S. Application Data (60) Provisional application No. 62/459,492, filed on Feb. 15, 2017.

(51) Int. Cl.
| | | |
|---|---|---|
| *H04R 1/08* | (2006.01) | |
| *F16F 7/14* | (2006.01) | |
| *F16F 15/08* | (2006.01) | |
| *F16M 11/10* | (2006.01) | |

(52) U.S. Cl.
CPC ............ *H04R 1/08* (2013.01); *F16F 7/14* (2013.01); *F16F 15/08* (2013.01); *F16F 2224/025* (2013.01); *F16F 2230/0005* (2013.01); *F16F 2236/06* (2013.01); *F16M 11/10* (2013.01)

(58) Field of Classification Search
CPC ..... H04R 1/08; F16F 7/14; F16F 15/08; F16F 2224/025; F16F 2230/0005; F16F 2236/06; F16M 11/10

USPC .......... 381/361, 363, 368; 181/141; 248/60, 248/317
See application file for complete search history.

(56) References Cited

U.S. PATENT DOCUMENTS

| | | | | |
|---|---|---|---|---|
| 1,805,362 A | * | 5/1931 | Ellis | H04R 1/08 381/368 |
| 4,194,096 A | | 3/1980 | Ramsey | |
| 4,396,807 A | | 8/1983 | Brewer | |
| 4,514,598 A | * | 4/1985 | Plice | H04R 1/08 248/104 |
| 4,546,950 A | | 10/1985 | Cech | |
| 6,459,802 B1 | * | 10/2002 | Young | H04R 1/083 381/361 |
| 6,724,904 B1 | * | 4/2004 | Winter | H04R 1/083 181/178 |
| 8,737,662 B2 | * | 5/2014 | Zukowski | H04R 1/086 381/354 |
| D707,662 S | * | 6/2014 | Okita | D14/229 |

(Continued)

OTHER PUBLICATIONS

PCT International Patent Application No. PCT/US18/18413; International Search Report and Written Opinion of the International Searching Authority dated May 4, 2018, 9 pages.

*Primary Examiner* — Jeremy A Luks
(74) *Attorney, Agent, or Firm* — Craig R. Miles; CR Miles P.C.

(57) ABSTRACT

A device for isolating shock and vibration transmitted to an audio device, such as a microphone, the device including a frame, a shock isolation assembly adapted to receive a bottom end of the microphone, a top suspension adapted to elastically suspend at least a partial section of the microphone, and a bottom suspension adapted to suspend the shock isolation assembly.

12 Claims, 6 Drawing Sheets

(56) References Cited

U.S. PATENT DOCUMENTS

| | | | | |
|---|---|---|---|---|
| 8,814,118 B2* | 8/2014 | Okita | ................ | H01F 7/0252 24/495 |
| 9,014,402 B2* | 4/2015 | Terpstra | ................ | H04R 1/02 381/160 |
| 9,843,852 B2* | 12/2017 | Mcgovern, Jr. | ............ | F16F 7/14 |
| 2007/0195983 A1* | 8/2007 | Klemme | ................ | H04R 1/08 381/362 |
| 2013/0270414 A1 | 10/2013 | McGovern, Jr. et al. | | |
| 2014/0270311 A1 | 9/2014 | Parker et al. | | |

* cited by examiner

SHOCK MOUNT

This United States Non-Provisional Patent Application claims the benefit of U.S. Provisional Patent Application No. 62/459,492, filed Feb. 15, 2017, hereby incorporated by reference herein.

I. BACKGROUND OF THE INVENTION

This application relates to structures that serve to hold, protect, and mount audio devices, particularly structures that are used to isolate microphones from mechanically transmitted noise.

II. SUMMARY OF THE INVENTION

Accordingly, the present invention includes a device for isolating shock and vibration otherwise transmitted to audio devices, such as a studio condenser microphone, the device comprising one or more of: an annular frame having a top ring member and a bottom ring member disposed in opposite or generally planar alignment and at least one upright member disposed between the top ring member and the bottom ring member, the frame adapted to vertically receive the audio device; a shock isolation assembly adapted to receive a bottom end of the audio device; a set of four compliant suspension members, each secured to the shock isolation assembly; a first set of four pairs of band securement members for attachment of the set of four compliant suspension members, the first set of four pairs of band securement members connected to the bottom ring member and each pair can be adapted to rotate about a longitudinal axis through the frame; a pair of second compliant suspension members adapted to elastically engage at least a partial section of the audio device (such as a microphone) from the top ring member; a second set of four pairs of band securement members for attachment of the pair of second compliant suspension members, the second set of four pairs of band securement members connected to the top ring member and each pair can be adapted to rotate about a longitudinal axis through the frame; and, a stand mount connected to the at least one upright member, the stand mount adapted to mount the frame to a microphone stand.

The present invention also includes a method for isolating shock and vibration otherwise transmitted to audio devices, such as a studio condenser microphone, the method comprising one or more of: providing a frame having a top ring member and a bottom ring member; providing a shock isolation mount; fastening a first set of four pairs of band securement members to the top ring member; attaching a first compliant suspension member to two pairs of the first set of band securement members; attaching a second compliant suspension member to another two pairs of the first set of band securement members; attaching a set of four compliant suspension members to a second set of four pairs of band securement members; fastening the second set of four pairs of band securement members and the set of four compliant suspension members to the isolation shock mount; providing at least one upright member to connect the top ring member to the bottom ring member; disposing the audio device (such as a microphone) through a space defined between the first and second compliant suspension members attached to the top member; and, securing the microphone into the isolation shock mount.

The above description sets forth, a summary of particular embodiments of the present invention so that the detailed description that follows may be better understood and contributions of the present invention to the art may be better appreciated. It is not meant to identify key or essential features of any claimed subject matter that may later claim priority to the present description. There may be, of course, other features of the invention that will be described below and may form the subject matter of claims. Furthermore, the scope of any such claimed subject matter would not be limited to implementations that solve any disadvantages noted above or contained herein.

III. BRIEF DESCRIPTION OF THE DRAWINGS

Many aspects of the present invention can be better understood with reference to the following drawings. The components in the drawings are not necessarily to scale. Emphasis instead, being placed upon clearly illustrating the principles of the present invention. Moreover, in the drawings, like reference numerals designate corresponding parts throughout the several views.

IV. DETAILED DESCRIPTION OF THE INVENTION

Embodiments will now be described, by way of example, with reference to the drawings, where like reference numerals represent like parts throughout the various drawing figures.

Figure 1:
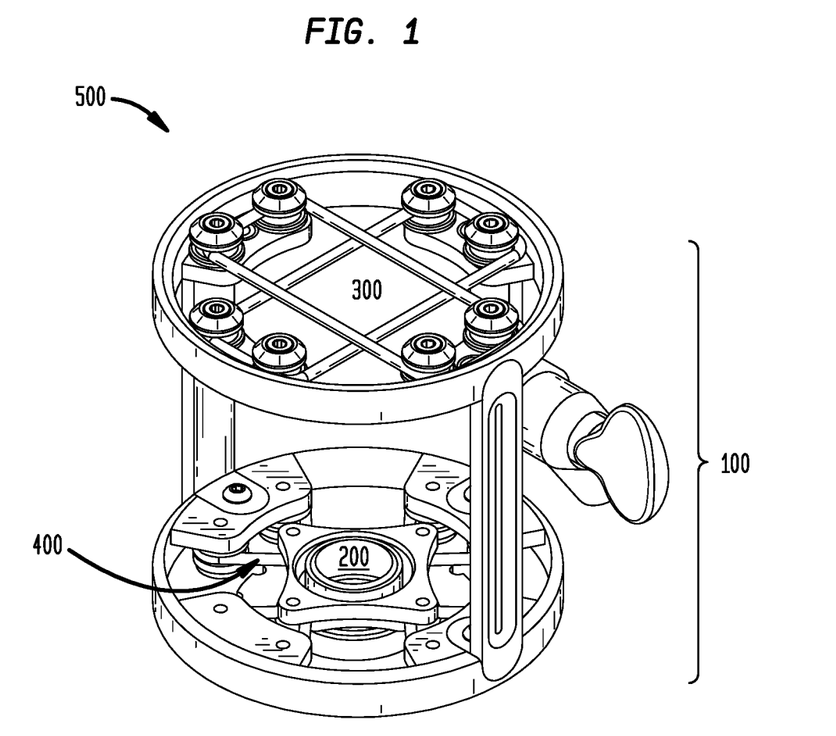
FIG. 1 is an isometric, top view of a particular embodiment of a shock mount.
Figure 7:
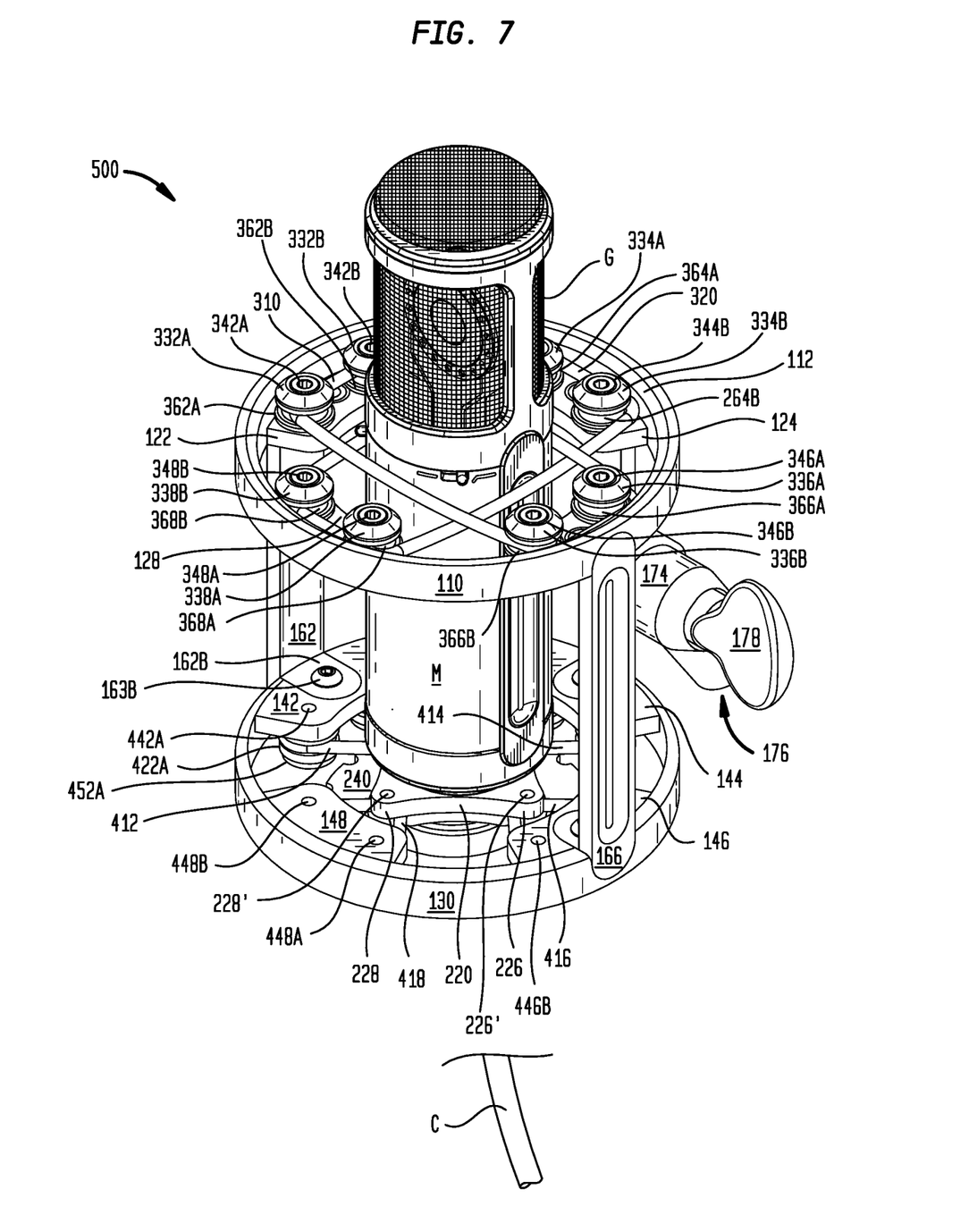
FIG. 7 is an isometric, top view of the particular embodiment of the shock mount shown in FIG. 1 engaged to a microphone.

Referring primarily to FIG. 1, audio device shock mount (500) comprises a device for shock and vibration isolation of an audio device, such as the studio condenser microphone or microphone (M) (as shown in the example of FIG. 7). Generally, the shock mount (500) includes an annular frame (100), a shock isolation assembly (200), and top and bottom suspension assemblies (300), (400) which include various components which, when holding audio equipment, such as the microphone M, isolate vibrations that would otherwise alter the output of the audio device.

Figure 2:
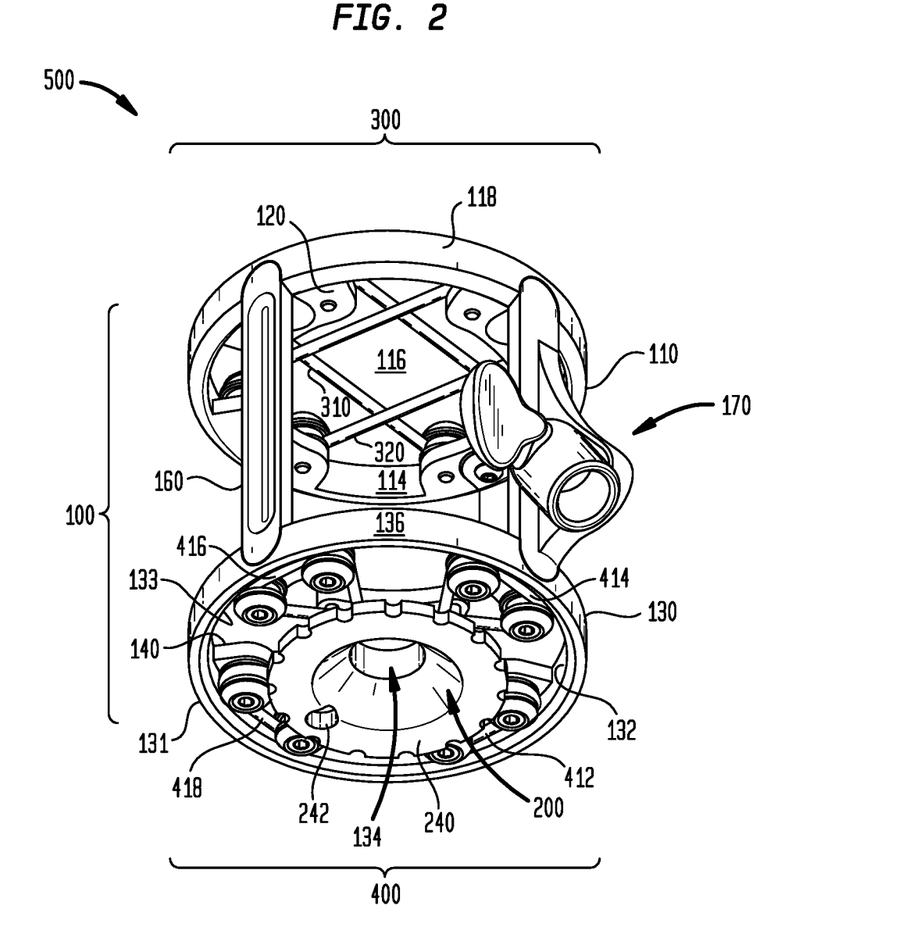
FIG. 2 is an isometric, bottom view of the particular embodiment of the shock mount shown in FIG. 1.
Figure 3:
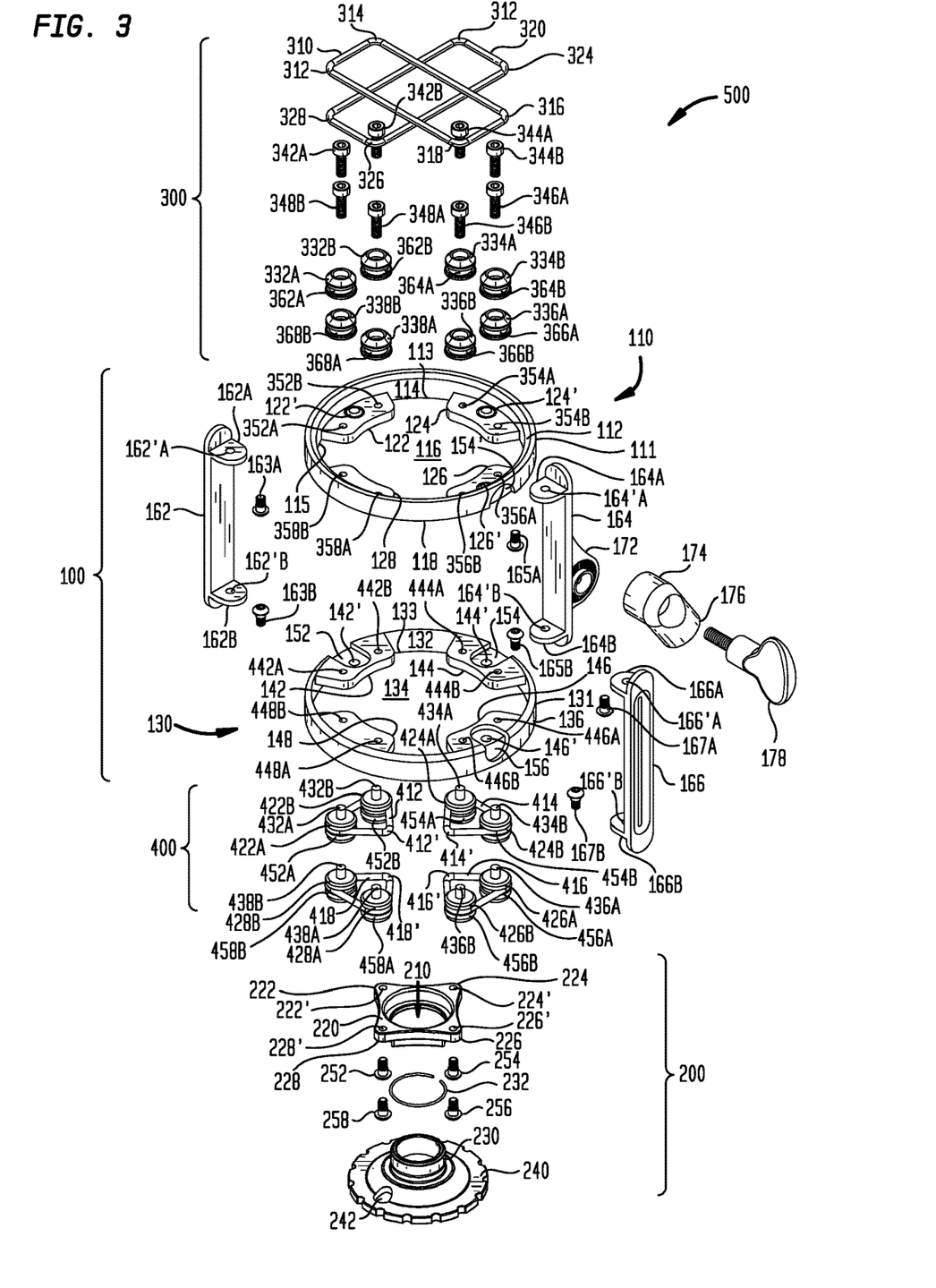
FIG. 3 is an exploded view of the particular embodiment of the shock mount shown in FIG. 1.

Referring primarily to FIG. 2, the annular frame (100) can be a partially open walled and open-ended frame (100) made up of one or more of: a top ring member (110), top ring member shelves (120), a bottom ring member (130), bottom ring member shelves (140) and recesses (150) (as shown in the example of FIG. 3 (152, 154, 154' and 156)), upright members (160), and a stand mount assembly (170) for coupling the audio equipment shock mount to a support stand.

Referring primarily to FIGS. 2 and 3, the top ring member (110) includes a top ring inner surface (114) defining a top ring member interior area (116) in which to receive the audio device (such as a microphone (M)) and an outer ring surface (118). The inner and outer ring surfaces (114), (118) joined by upper and lower top ring member edges (111), (115) (as shown in the example of FIG. 3). A top ring member annular lip (112) can be disposed in the top ring member upper edge (111) extending from the ring inner surface (114) a distance radially outward toward the outer ring surface (118).

Still referring primarily to FIGS. 2 and 3, a plurality of top ring member shelves (120) can be coupled to the top ring member (110) inner surface (114). In particular embodiments, four shelves (122, 124, 126, 128) can be coupled in circumferentially spaced apart relation to the top ring member (110) inner surface (114) proximate the top ring member bottom edge (115) and extend inward of the interior area (116) of the top ring member (110). The four shelves (120) can be disposed in opposite relation across the inner interior area (116) of the top ring member (110). All four shelves (122, 124, 126, 128) are disposed along the lower edge (113) of inner surface (114). In addition, fastener receiving aperture elements (122', 124', 126') can be medially disposed in each of three (122, 124, 126) of the four shelves (120). Recesses (150) can be disposed in each of the three (122, 124, 126) of the four shelves (120) to correspondingly mate (154') to receive one top flange (162A, 164A, 166A) of upright members (162, 164, 166).

Referring primarily to FIG. 2, bottom ring member (130) includes bottom ring member inner surface (132) defining a bottom ring member interior area (134) to receive shock isolation components (200) which couple to the microphone (M) received within the top ring member interior area (116) and bottom ring member outer surface (136) joined by bottom ring member upper and bottom edges (131), (133). A bottom ring member annular lip (134) can be disposed in the bottom ring member upper edge (131) extending from the ring inner surface (132) a distance radially outward toward the outer ring surface (136).

Again, referring primarily to FIGS. 2 and 3, a plurality of bottom ring member shelves (140) can be coupled to the bottom ring member inner surface (132). In a particular embodiment shown in FIG. 3, the bottom ring member shelves (140) can be coupled in circumferentially spaced apart relation to the bottom ring member inner surface (132) proximate the bottom ring member upper edge (131) and extend inward of the bottom ring member interior area (134). Each of the four shelves (142, 144, 146, 148) on the bottom ring member (130) can be circumferentially aligned opposite to each corresponding top ring member shelves (122, 124, 126, 128) in opposite or generally planar alignment with each of the top ring member shelves (122, 124, 126, 128). All four bottom ring member shelves (142, 144, 146, 148) can be disposed along the upper edge (131) of bottom ring member (130). Fastener receiving aperture elements (142', 144', 146') can be medially disposed in three (142, 144, 146) of the four shelves (140). Recesses (152, 154, 156) can be disposed in each of the three (142, 144, 146) of the four shelves (140) to correspondingly mate to receive one bottom flange (162B, 164B, 166B) of upright members (162, 164, 166).

In various embodiments, the top ring member (110) and bottom ring member (130) can, but not necessarily, be constructed as duplicates. Then in deployment, each can be used as the mirror image of one another with the bottom ring shelves (140) having a diametrically opposite directional arrangement to the top ring shelves (120), resulting in the bottom ring shelves (140) facing outwardly away from the top ring member (110) and the top ring shelves (120) facing outwardly away from the bottom ring member (130). The illustrative examples of the ring members (110, 130), and corresponding shelves (120, 140) are not intended to preclude embodiments which incorporate similar or equivalent annular frames and platforms, currently or prospectively available.

Figure 4:
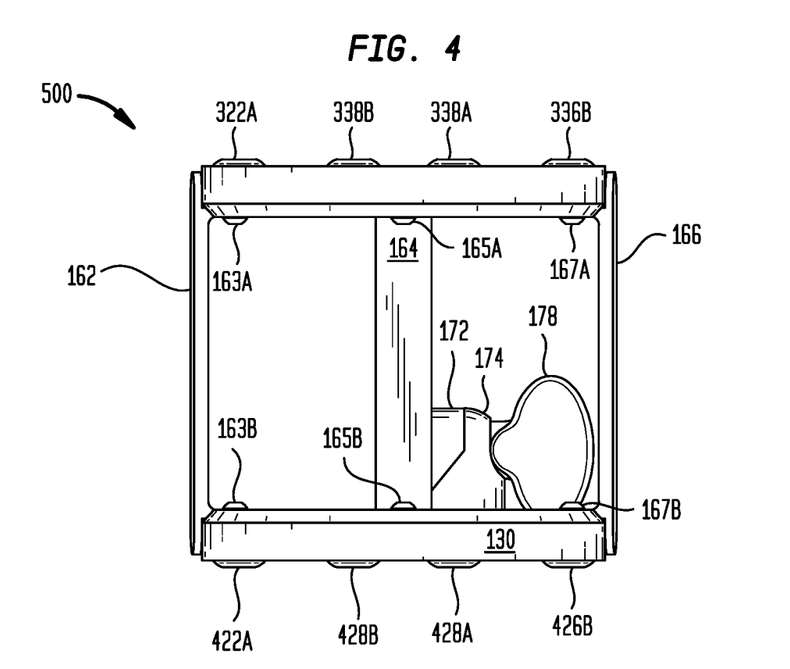
FIG. 4 is a left side view of the particular embodiment of the shock mount shown in FIG. 1.
Figure 5:
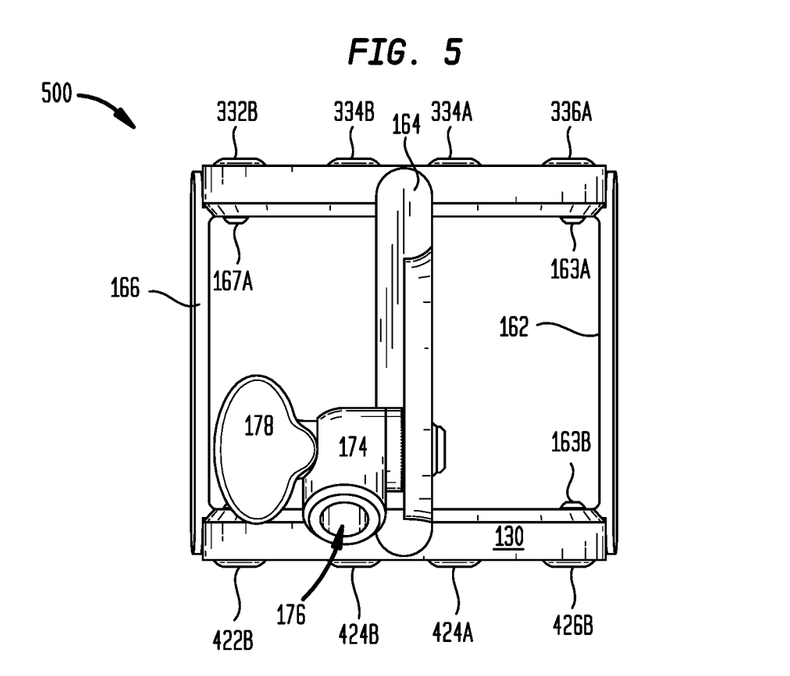
FIG. 5 is a right side view of the particular embodiment of the shock mount shown in FIG. 1.
Figure 6:
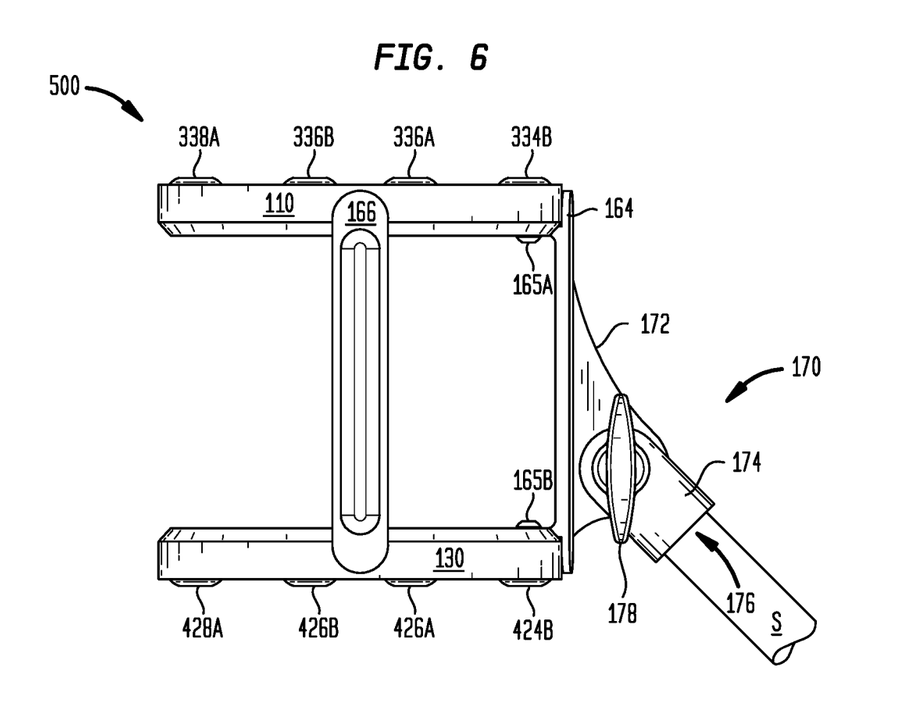
FIG. 6 is a front side view of the particular embodiment of the shock mount shown in FIG. 1.

With continuing reference to FIG. 3 and now referring to FIGS. 4 through 6, each upright member (162, 164, 166) can include a top flange (162A, 164A, 166A) and a bottom flange (162B, 164B, 166B), and each flange (162A, 164A, 166A), (162B, 164B, 166B) includes a generally centered fastener receiving hole (162A', 164A', 166A'), (162B', 164B', 166B'). Mechanical fasteners (163A, 165A, 167A), (163B, 165B, 167B) can be used to correspondingly fasten each flange (162A, 164A, 166A), (162B, 164B, 166B) of the upright members (160) to the top ring member (110) and bottom ring member (130). In another embodiment, other fasteners and fastener components including various kinds and combinations of bolts, washers, or nuts may be used in accordance with the scope of the invention.

Still referring primarily to FIGS. 3 through 6, the stand mount assembly (170) can be attached to upright member (164). In a particular embodiment, stand mount assembly (170) can be a stand fastener including a stem (172), collar (174), threaded turn-key (176), and stand receiving port (178). Depending on the kind of stand (S), it is contemplated that other assemblies hor fasteners and fastener components including various combinations of bolts, washers, or nuts may be used in accordance with the scope of the invention to fasten the shock mount (500) to a stand (S).

While FIGS. 1 through 7 generally illustrate a cylindrically shaped frame, those skilled in the art will appreciate that other configurations of the annular frame (100) can be employed by embodiments of the shock mount (500) and as illustrative examples the annular frame (100) can define a generally square, rectangular, circular, oval or other top or bottom ring (110), (130) inner (114), (132) or outer surface (118), (136).

Referring primarily to FIGS. 1 through 3, an embodiment of the shock isolation assembly (200) provides a foundational mounting point for an audio device. As one illustrative example, the shock isolation assembly (200) includes a receiving port (210), a collar (220), a base (230), and a platform (240). Collar (220) can, but need not necessarily, be a four-cornered (222, 224, 226, 228) collar (220) with corners (222, 224, 226, 228) extending away from the port (210) towards the bottom ring member shelves (140). Further disposed in each corner (222, 224, 226, 228) can be fastener receiving holes (222', 224', 226', 228'). Base (230) can, but need not necessarily, be configured to receive the threaded bottom end of the audio device, such as a microphone (M) (as shown in the example of FIG. 7). A clip (232) can be used to attach the collar (220) to the base (230). Platform (240) provides a support for base (230) and includes a recess (242) for ease of assembly. The receiving port (210) extends through the platform (240) to provide space for a power cord (C) (as shown in the example of FIG. 7). Mechanical fasteners (250) fasten the base (230) and platform (240) to the collar (220) at the four corners (222, 224, 226, 228). Each mechanical fastener (252, 254, 256, 258) can be received by the corner hole (222', 224', 226', 228').

With continuing reference to FIGS. 1 through 3, top suspension (300) includes a pair of compliant suspension members (310), (320). Compliant suspension members (310), (320) can comprise a substantially non-resonant elastic material. The term "non-resonant" for the purposes of this invention means not producing or enhancing resonance. The term "elastic" for the purposes of this invention means a material able to spontaneously return toward is original configuration after being stretched. As to particular embodiments, the non-resonant elastic material can be polymers of silicone. In particular embodiments, each compliant suspension member (310), (320) can be configured in or can be conformed to an approximately rectangular shape, each having corners (312, 314, 316, 318), and (322, 324, 326, 328). The compliant suspension members (310), (320) of the top suspension (300) attach to the frame (100) of the shock mount (500) by way of four pairs of band securement members (330). Each pair of band securement members (330) can be fastened to one of the four shelves (120) of the top ring member (110).

As illustrated in FIGS. 1 through 3, and 7, mechanical fasteners (342 A and B, 344 A and B, 346 A and B, 348 A and B) fasten each pair of band securement members (332 A and B, 334 A and B, 336 A and B, 338 A and B) to a corresponding shelf (120) via the suspension securement holes (350). Mechanical fasteners (342 A and B, 344 A and B, 346 A and B, 348 A and B) correspondingly fasten to suspension securement holes (352 A and B, 354 A and B, 356 A and B, 358 A and B) of shelves (122, 124, 126, 128).

Now referring primarily to FIG. 7, the corners (312, 314, 316, 318) and (322, 324, 326, 328) of compliant suspension members (310), (320) can conform or be configured to continuously circuitously engage about corresponding band securement members (330). Each of compliant suspension members (310), (320) can engage the external surface of the audio device, such as microphone (M). As shown in the illustrative example of FIG. 7, the compliant suspension members (310), (320) engage the external surface of the audio device (shown in the example as a microphone (M) below the grille (G)). In particular embodiments, if an audio device, such as microphone (M), moves while being held in suspension by device (500), the band securement members (330) can rotate about the mechanical fasteners (340), allowing the load carried in the compliant suspension members (310), (320) and by the compliant suspension members' (310), (320) corners (312, 314, 316, 318) and (322, 324, 326, 328) to be distributed, dispersed, relieved or discretized over a greater portion of the compliant suspension members (310), (320) and can carry less load per unit length of each compliant suspension member (310), (320). Therefore, generation of the stretched condition of the compliant suspension members (310), (320) and the return of the compliant suspension members (310), (320) toward the non-tensioned condition may occur with less release of shear force per unit length of the compliant suspension members (310), (320). In other words, the movement of the mounted audio device (M) may be more uniform and less sudden than if the compliant suspension members (310), (320) had ends at a fixed location. Additionally, the compliant suspension members (310), (320) may be subject to lesser stretching per unit length and can be subject to less degradation of performance over time, even during long usage periods.

As to particular embodiments, an annular groove (360) can be circumferentially disposed on the peripheral face of each band securement member (332 A and B, 334 A and B, 336 A and B, 338 A and B). The annular grooves (362 A and B, 364 A and B, 366 A and B, 368 A and B) can have a groove depth and a groove width of sufficient dimensions to receive and retain a corresponding portion of the compliant suspension members (310), (320) during normal use of the shock mount (500).

It is contemplated other fasteners and fastener components including various combinations of screws, bolts, washers, or nuts may be used in accordance with the scope of the invention to fasten the band securement members (330) to the top ring member shelves (120).

Those skilled in the art will appreciate that other non-limiting configurations of the top suspension (300) and may also be employed by the present embodiments which include a greater or lesser number of band securement members (332), (338) or compliant suspension members (310), (320).

Referring primarily to FIGS. 1 through 3, in particular embodiments, bottom suspension (400) can include a set of four compliant suspension members (410), each compliant suspension member (412, 414, 416, 418) including a non-resonant elastic material, as above described. Each compliant suspension member (412, 414, 416, 418) can be configured in or can be conformed to an approximately triangular configuration, each having three corners. The bottom compliant suspension members (412, 414, 416, 418) attach to the shock isolation mount (200) of the device (500) by four pairs of corresponding band securement members (422 A and B, 424 A and B, 426 A and B, 428 A and B). The attachment can be achieved by slipping a portion or exposed corner (412', 414', 416', 418') of each compliant suspension member (412, 414, 416, 418) over the mechanical fasteners (252, 254, 256, 258) prior to or after driving each fastener (252, 254, 256, 258) into the collar (220).

Referring primarily to FIGS. 1 through 3, and 7, mechanical fasteners (432 A and B, 434 A and B, 436 A and B, 438 A and B) fasten each band securement member (422 A and B, 424 A and B, 426 A and B, 428 A and B) to a corresponding shelf (140) via the suspension securement holes (440). Mechanical fasteners (432 A and B, 434 A and B, 436 A and B, 438 A and B) correspond to suspension securement holes (442 A and B, 444 A and B, 446 A and B, 448 A and B) of shelves (142, 144, 146, 148).

Now referring primarily to FIGS. 3 and 7, two of the three corners of the set of four compliant members (410) of the bottom suspension (400) are configured to correspondingly continuously circuitously engage about band securement members (420) and mechanical fasteners (252, 254, 254, or 258) (generally) to suspend the audio device, such as a microphone (M) in tension while the microphone (M) is secured in the shock isolation mount (200). If the microphone (M) is displaced while being held in suspension by the shock mount (500), the compliant suspension members (410) can rotate about the band securement members (422 A and B, 424 A and B, 426 A and B, 428 A and B) and mechanical fasteners (430), allowing some of the force being carried in the compliant suspension members (410) and by the compliant suspension members' (410) corners to be distributed, dispersed, relieved or discretized over a greater portion of the compliant suspension members (410) as above described in relation to the top suspension (300).

As to particular embodiments, an annular groove (450) can be circumferentially disposed on the peripheral face of each band securement member (422 A and B, 424 A and B, 426 A and B, 428 A and B). The annular grooves (452 A and B, 454 A and B, 456 A and B, 458 A and B) can have a groove depth and a groove width of sufficient dimensions to receive and retain a corresponding portion of the compliant suspension members (412, 414, 416, 418) during normal use of the shock mount (500).

It is contemplated other fasteners and fastener components including various combinations of screws, bolts, washers, or nuts may be used in accordance with the scope of the invention to fasten the band securement members (420).

Those skilled in the art will appreciate that other non-limiting configurations of the bottom suspension (400) and may also be employed by the present embodiments.

In various embodiments, the top suspension (300) and bottom suspension (400) can, but not necessarily, be constructed as duplicates. Then in deployment, each can be used as the mirror image of one another with the bottom ring shelves (140) having a diametrically opposite directional arrangement to the top ring shelves (120), resulting in the bottom ring shelves (140) facing outwardly away from the top ring member (110) and the top ring shelves (120) facing outwardly away from the bottom ring member (130). The illustrative examples of the band securement members (330, 420), and corresponding shelves (120, 140) are not intended to preclude embodiments which incorporate similar or equivalent rotatable structures, currently or prospectively available.

As can be easily understood from the foregoing, the basic concepts of the present invention may be embodied in a variety of ways. The invention involves numerous and varied embodiments of a microphone shock mount and methods for shock and vibration isolation and using such microphone shock mount including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "mount" should be understood to encompass disclosure of the act of "mounting"—whether explicitly discussed or not—and, conversely, were there effectively disclosure of the act of "mounting", such a disclosure should be understood to encompass disclosure of a "mount" and even a "means for mounting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the shock mounts herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A device, comprising:
    a pair of compliant suspension members crisscrossed to define a four-point elastic suspension to engage an audio device;
    a shock isolation mount adapted to receive a bottom end of said audio device;
    a set of four compliant suspension members coupled to said shock isolation mount;
    a frame having an at least partially open top ring member and an at least partially open bottom ring member in opposite alignment;
    at least one upright member connecting said top ring member and said bottom ring member;
    a first set of four pairs of band securement members coupled to said bottom ring member, each one of said set of four compliant suspension members coupled to one pair of said first set of four pairs of band securement members; and
    a second set of four pairs of band securement members coupled to said top ring member, each one of said pair of compliant suspension members coupled to two pair of said second set of four pairs of band securement members.

2. The device of claim 1, wherein said audio device comprises a microphone.

3. The device of claim 1, wherein said shock isolation mount comprises:
    a microphone receiving port;
    a microphone collar having four corners, said microphone collar defining a circumferential edge of said receiving port;
    a cylindrical base connected to said microphone collar, wherein said cylindrical base is adapted to threadably receive said bottom end of said microphone; and
    a platform connected to a bottom end of said cylindrical base.

4. The device of claim 1, wherein each pair of said first set and said second set of four pairs of band securement members is adapted to rotate about a longitudinal axis through said frame.

5. The device of claim 3, wherein said pair of compliant suspension members crisscrossed to define a four-point elastic suspension of said microphone connects to said microphone at a point along a vertical axis of said microphone that is below a grille of said microphone.

6. The device of claim 1, wherein said pair of compliant suspension members is made from silicone.

7. The device of claim 1, wherein said set of four compliant suspension members is made from silicone.

8. The device of claim 1, wherein said frame comprises:
    a stand mount connected to said at least one upright member, said stand mount adapted to mount said frame to a microphone stand.

9. A method, comprising:
    disposing a top ring member opposite a bottom ring member;
    connecting at least one upright member between said top ring member and said bottom ring member;
    fastening a first set of four pairs of band securement members to said top ring member;
    attaching a first compliant suspension member to two pairs of said first set of four pairs of band securement members;
    attaching a second compliant suspension member to another two pairs of said first set of band securement members;
    fastening a second set of four pairs of band securement members to said bottom ring member;
    centrally locating a shock isolation mount within said bottom ring member;
    attaching one of a set of four compliant members to each of a second set of four pairs of band securement members;
    fastening each one of said set of four compliant suspension members to said isolation shock mount;
    disposing an audio device through a space defined between said first compliant suspension member and said second compliant suspension member; and
    securing said audio device into said isolation shock mount.

10. The method of claim 9, further comprising:
    providing a stand mount attached to said at least one upright member; and
    securing said stand mount to a stand.

11. The method of claim 9, wherein said first compliant suspension member and said second compliant suspension member comprise silicone.

12. The method of claim 9, wherein said set of four complaint suspension members comprise silicone.

* * * * *